(12) United States Patent
Weissman et al.

(10) Patent No.: US 6,711,249 B2
(45) Date of Patent: Mar. 23, 2004

(54) COMMON GATEWAY TO CALL CONTROL SYSTEMS

(75) Inventors: Terry R. Weissman, Los Altos Hills, CA (US); James R. Everingham, Aptos, CA (US)

(73) Assignee: Tellme Networks, Inc., Mountain View, CA (US)

( * ) Notice: Subject to any disclaimer, the term of this patent is extended or adjusted under 35 U.S.C. 154(b) by 506 days.

(21) Appl. No.: 09/780,530

(22) Filed: Feb. 8, 2001

(65) Prior Publication Data

US 2002/0146108 A1 Oct. 10, 2002

(51) Int. Cl.$^7$ .......................... H04M 7/00; H04M 3/00; H04M 5/00

(52) U.S. Cl. ........................... 379/221.06; 379/265.02; 379/219

(58) Field of Search ................... 379/221.06, 265.02, 379/219, 220.01, 201.05; 709/310, 311, 317, 320

(56) References Cited

U.S. PATENT DOCUMENTS 6,549,949 B1 * 4/2003 Bowman-Amuah .......... 709/236
2002/0015480 A1 * 2/2002 Daswani et al. ............ 379/88.17

* cited by examiner

Primary Examiner—Benny Tieu
(74) Attorney, Agent, or Firm—Bever, Hoffman & Harms, LLP; Jeanette S. Harms

(57) ABSTRACT

A method of and apparatus for supporting intelligent call routing (ICR) systems multiple vendors, in a vendor neutral fashion using a computer is described. One embodiment has a voice program send a call routing request using an HTTP format to a call routing program. The call routing program decodes the HTTP request and identifies the appropriate vendor-specific communication format and communications method for talking to the ICR system specified in the HTTP request. The call routing program sends the request and receives the answers from the ICR system in the vendor specific formats. The call routing program provides the ICR system response back to the voice program in a vendor neutral fashion. This approach allows voice programs to easily be written that work with multiple ICR systems and allow component reuse of call routing code amongst programs that end up working with multiple systems.

12 Claims, 2 Drawing Sheets

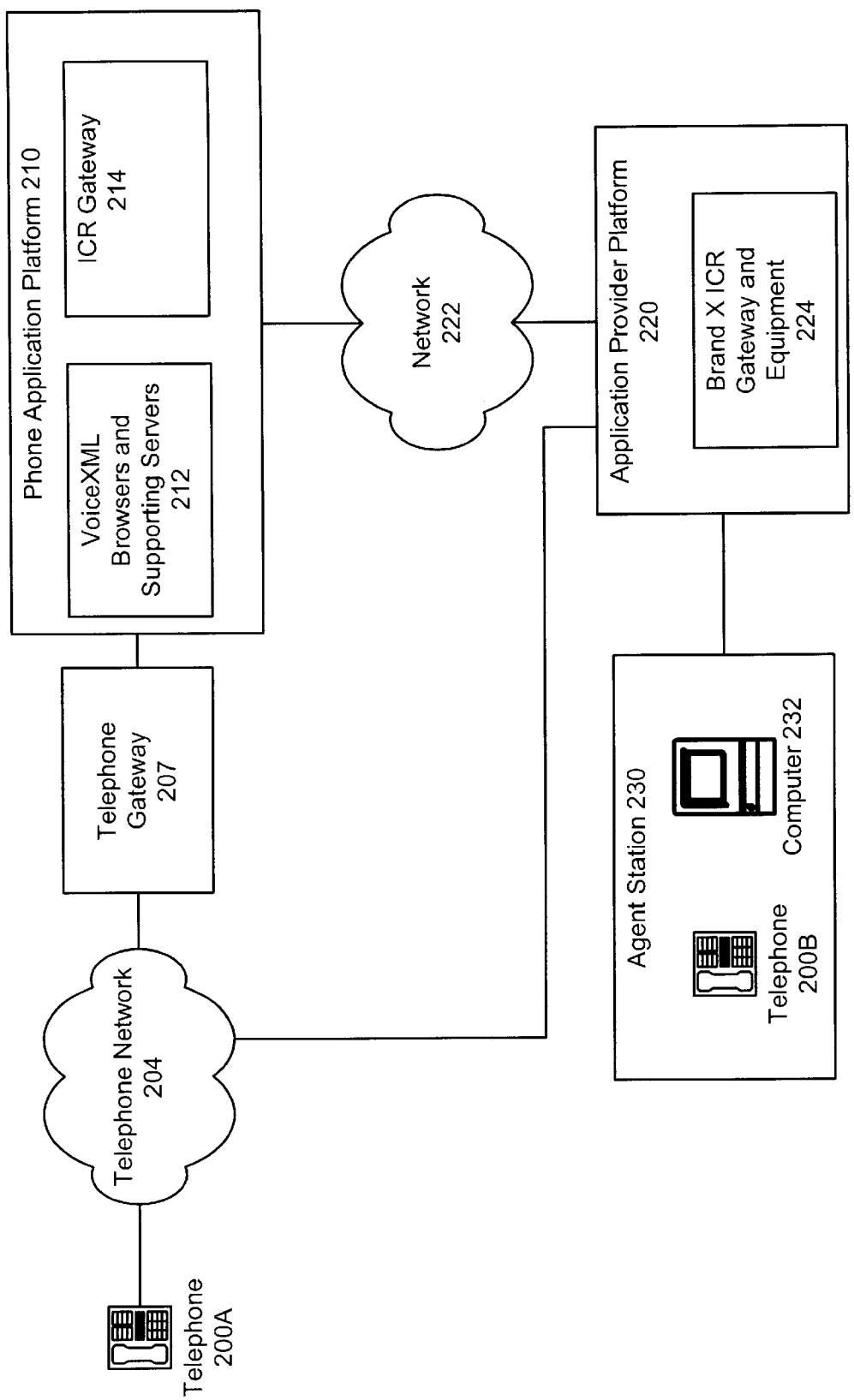

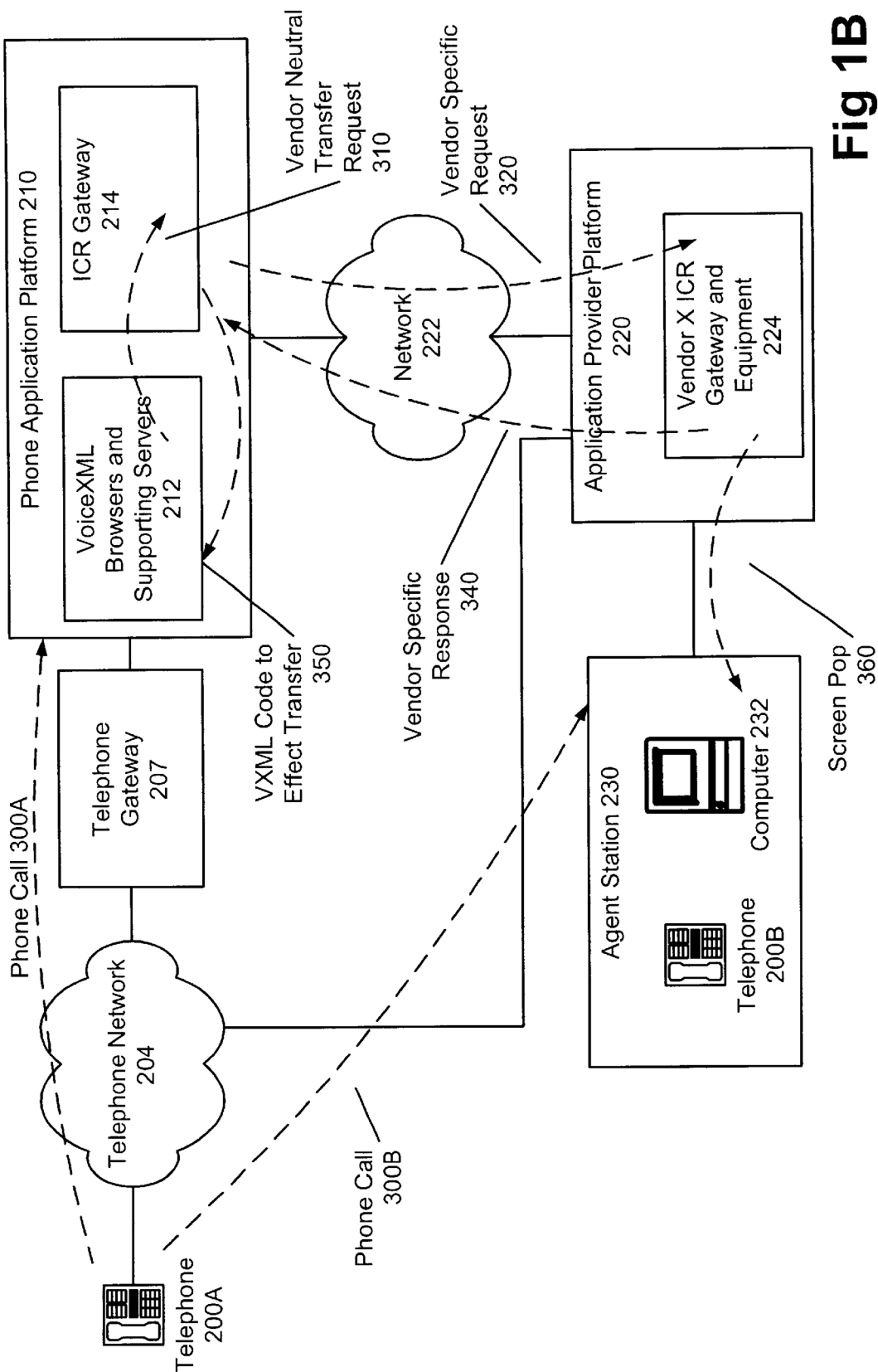

COMMON GATEWAY TO CALL CONTROL SYSTEMS

BACKGROUND OF THE INVENTION

1. Field of the Invention

This invention relates to the field of phone based communications. In particular, the invention relates to methods for providing a uniform interface to call center integration equipment that is vendor neutral.

2. Description of the Related Art

A variety of vendor specific call center integration equipment is manufactured. More specifically call routing equipment is used to control, and monitor, allocation of calls amongst a variety of call center facilities and provide support for database lookups and the like. The equipment is designed for programming using vendor specific programming interfaces and/or communication protocols. Accordingly one would use a different approach to obtain information from a Cisco call routing equipment than a Genesys call routing equipment.

This approach is limiting in the context of a phone application platform where calls for many vendors are being handled by a single platform. It additionally makes it difficult to describe programs in a vendor-neutral fashion.

Accordingly, what is needed is a method and apparatus for handling call center integration equipment in a vendor neutral fashion.

BRIEF DESCRIPTION OF THE FIGURES

FIG. 1A illustrates the components of a phone application platform supporting the vendor neutral call center integration.

FIG. 1B illustrates the use of the system of FIG. 1A in call center integration.

SUMMARY OF THE INVENTION

A method of and apparatus for supporting intelligent call routing (ICR) systems multiple vendors, in a vendor neutral fashion using a computer is described. One embodiment has a voice program send a call routing request using an HTTP format to a call routing program. The call routing program decodes the HTTP request and identifies the appropriate vendor-specific communication format and communications method for talking to the ICR system specified in the HTTP request. The call routing program sends the request and receives the answers from the ICR system in the vendor specific formats. The call routing program provides the ICR system response back to the voice program in a vendor neutral fashion. This approach allows voice programs to easily be written that work with multiple ICR systems and allow component reuse of call routing code amongst programs that end up working with multiple systems.

DETAILED DESCRIPTION

A. Introduction

A method and apparatus for interfacing with call center routing equipment in a vendor neutral fashion is described. This approach can be used for a number of straightforward purposes from straightforward call routing to allowing interactive hold.

The invention will be described in greater detail as follows. First, a number of definitions useful to understanding the invention are presented. Then, the basic architecture for a phone application platform supporting the method is presented. Finally, the processes and features are presented in greater detail.

B. Definitions

1. Telephone Identifying Information

For the purposes of this application, the term telephone identifying information will be used to refer to ANI (automatic numbering identification) information, CID (caller identification) information, and/or some other technique for automatically identifying the source of a call and/or other call setup information. For example, telephone identifying information may include a dialed number identification service (DNIS). Similarly, CID information may include text data including the subscriber's name and/or address, e.g. "Jane Doe". Other examples of telephone identifying information might include the type of calling phone, e.g. wireless, pay phone, and/or hospital phone. Additionally, the telephone identifying information may include wireless carrier specific identifying information, e.g. location of wireless phone now, etc. Also, signaling system seven (SS7) information may be included in the telephone identifying information.

2. User Profile

A user profile is a collection of information about a particular user. The user profile typically includes collections of different information of relevance to the user, e.g., account number, name, contact information, user-id, default preferences, and the like. Notably, the user profile contains a combination of explicitly made selections and implicitly made selections.

Explicitly made selections in the user profile stem from requests by the user to the system. For example, the user might add business news to the main topic list. Typically, explicit selections come in the form of a voice, or touch-tone command, to save a particular location, e.g. "Remember this", "Bookmark it", "shortcut this", pound (#) key touch-tone, etc., or through adjustments to the user profile made through the web interface using a computer.

Additionally, the user profile provides a useful mechanism for associating telephone identifying information with a single user, or entity. For example, Jane Doe may have a home phone, a work phone, a cell phone, and/or some other telephones. Suitable telephone identifying information for each of those phones can be associated in a single profile for Jane. This allows the system to provide uniformity of customization to a single user, irrespective of where they are calling from.

In contrast, implicit selections come about through the conduct and behavior of the user. For example, if the user repeatedly asks for the weather in Palo Alto, Calif., the system may automatically provide the Palo Alto weather report without further prompting. In other embodiments, the user may be prompted to confirm the system's implicit choice, e.g. the system might prompt the user "Would you like me to include Palo Alto in the standard weather report from now on?"

Additionally, the system may allow the user to customize the system to meet her/his needs better. For example, the user may be allowed to control the verbosity of prompts, the dialect used, and/or other settings for the system. These customizations can be made either explicitly or implicitly. For example if the user is providing commands before most prompts are finished, the system could recognize that a less verbose set of prompts is needed and implicitly set the user's prompting preference to briefer prompts.

3. Topics and Content

A topic is any collection of similar content. Topics may be arranged hierarchically as well. For example, a topic might be business news, while subtopics might include stock quotes, market report, and analyst reports. Within a topic different types of content are available. For example, in the stock quotes subtopic, the content might include stock quotes. The distinction between topics and the content within the topics is primarily one of degree in that each topic, or subtopic, will usually contain several pieces of content.

4. Demographic and Psychographic Profiles

Both demographic profiles and psychographic profiles contain information relating to a user. Demographic profiles typically include factual information, e.g. age, gender, marital status, income, etc. Psychographic profiles typically include information about behaviors, e.g. fun loving, analytical, compassionate, fast reader, slow reader, etc. As used in this application, the term demographic profile will be used to refer to both demographic and psychographic profiles.

5. Cookie

The term cookie, as used herein, refers to a structured data element formatted according to the general principles of IETF RFC 2109 and/or some other state management standard.

A brief review of RFC 2109 may be useful. The core structure of a cookie is a name-value pair. The name is a token for identifying the cookie, e.g. "Customer", and the value is the value of that corresponding token, e.g. "Jane Doe".

Implicitly, each cookie is associated with the sending domain. According to RFC 2109, the implicitly set domain is the originating domain to which the HTTP request was sent. For example, if an HTTP GET request is sent to the request host "www.example.com", then the cookie set in response to that request would be implicitly associated with "www.example.com"

Additionally, a number of optional fields can be set, for example: a different domain for which the cookie is valid (Domain); a time to live (Max-Age); a version string (Version); etc. The phrases in parenthesis correspond to the RFC 2109 standard field names for the options.

C. Architecture

First, the hardware and software architecture of a system including an embodiment of the invention will be described with reference to FIG. 2. FIG. 2 illustrates a system including embodiments of the invention used to support phone applications, including the asynchronous communication application. The system of FIG. 2 can be used to allow deployment of phone applications without the need for specialized hardware and/or software.

The following lists the elements of FIG. 2 and describes their interconnections. FIG. 2 includes the telephone 200A, a telephone network 204, a telephone gateway 207, a phone application platform 210, a VoiceXML browsers and supporting servers 212, a network 222, an application provider platform 220, a brand X ICR gateway and equipment 224, an agent station 230, a telephone 200B, and a computer 232. The telephone 200A is coupled in communication with the telephone network 204. The telephone network 204 is coupled in communication with the telephone gateway 207 and the application provider platform 220 (in some embodiments the telephone network 204 may be coupled to the agent station 230 directly and/or a call center having multiple agent stations.) The telephone gateway 207 is coupled in communication with the phone application platform 210. The network 222 is coupled in communication with the phone application platform 210 and the application provider platform 220.

The following describes each of the elements of FIG. 2 in greater detail. The telephone 200A is a telephone interface to the phone application platform 210. The telephone 200A may be any sort of telephone and/or wireless telephone. For example the telephone 200A may be a land line phone, a PBX telephone, a satellite phone, a wireless telephone, and/or any other type of communication device capable of providing voice communication and/or touch-tone signals over the telephone network 204. However, any audio signal carrying interface could be used.

The telephone network 204 may be the public switched telephone network (PSTN) and/or some other type of telephone network. For example, some embodiments of the invention may allow users with a voice over Internet Protocol (IP) phone to access the phone application platform 210. The telephone network 204 is coupled to the telephone gateway 207 that allows the voice communications and/or touch-tone signals from the telephone network 204 to reach the phone application platform 210 in usable form. Similarly, the telephone gateway 207 allows audio signals generated by the phone application platform 210 to be sent over the telephone network 204 to respective telephones, e.g. the telephone 200A. The telephone network 204 generally represents an audio signal carrying network.

The phone application platform 210 is comprised of one or more computers providing the VoiceXML browsers and supporting servers 212. (In this embodiment, VoiceXML is one of the implementation languages.) The particular configuration shown is designed to support outsourced, or hosted, telephony provisioning as seen by the separation of the application provider platform 220 from the phone application platform 210. This allows the phone services to be provided by a different legal entity than the application and avoids the need of the legal entity providing the call center to be aware of difficult telecommunications provisioning issues associated with running the phone application platform 210. A more detailed description of one possible embodiment of the phone application platform 210 and features for working with audio content see U.S. patent application Ser. No. 09/431,002, entitled "Streaming Content Over a Telephone Interface", having inventors Hadi Partovi, et. al., filed Nov. 01, 1999, and assigned to the assignee of the current application.

Having described the basic architecture and some details, we now turn to implementation and other features in greater detail.

D. Implementation

A helpful starting point is to understand how ICR, or intelligent call routing, works. Vendors such as Cisco (Geotel brand) and Genesys are the dominant providers of ICR hardware and systems in the United States. In a traditional setting, the application provider has to develop an entire call center system, including any phone applications, e.g. DTMF front end menu, etc. The ICR systems are used to take the inputs to the DTMF systems and control the routing of the calls to call agents. The more advanced ICR setups use database lookups (database not shown in elements 222 or 224 of FIG. 1A) to identify customer records and perform call routing.

Typical ICR decisions would be based on the database lookup, availability of agents at particular call center, and/or specialties of the agents and the correspondence of the same to the customer's needs. A concrete example may help, MegaBank has a single 800# where customers can get banking services or insurance products. They call the 800# and press "1" for banking and "2" for insurance. In that case, the ICR system would route the call to an appropriate banking or insurance representative.

When these traditional prompting systems are built they have been designed to interoperate with the specific ICR systems used by an application provider. Thus, if MegaBank changes from Cisco to Genesys ICR systems, their entire application would have to be re-coded to take advantage of the system.

Turning back to the present invention and the basic configuration of FIG. 1A, the process for using an ICR gateway in a vendor independent fashion will be described with reference to the process flow arrows (dashed lines) of FIG. 1B.

The process starts with the phone call 300A from the telephone 200A. In this example, the telephone 200A is being used by a customer of the application provider platform 220. Over the phone call 300A, the user of the telephone 200A can interact with a voice application running on the phone application platform 210. In one embodiment the application is servers to the phone application platform 210 across the network 222, e.g. from a web server (not shown).

At some point in the application, the customer requests to speak to a live agent (either implicitly or explicitly). At that point, the running VoiceXML application (VoiceXML is one of several possible application programming languages that may be available on the phone application platform 210), issues a vendor neutral transfer request 310 to an ICR gateway 214. The format of the vendor neutral transfer request 310 will be discussed in greater detail below.

Continuing the process, the ICR gateway 214 responds to the vendor neutral transfer request 310 by generating an appropriate vendor specific request 320. The ICR gateway 214 needs to be programmed a single time for each supported brand/variety of ICR equipment. In one embodiment, one or more data are kept on the ICR gateway to specify the equipment vendor for a particular application provider. For example, a simple application URI to vendor table could be maintained along with the address of the gateway, e.g.:

| | | |
|---|---|---|
| http://www.example.com/application1.vxml | cisco-prot-1 | 192.168.168.10 |
| http://www.example.com/application2.vxml | geotel-prot-4 | 192.168.168.56 |

Other information such as encryption, specific dedicated (or virtual) network connections to use could also be specified. In other embodiments, the vendor neutral request 310 specifies a specific ICR, e.g. the vendor X ICR 224, by a mutually agreed upon name, e.g. "MegaBankMainICR" for which suitable information is maintained in the ICR gateway 214 (such as that shown above) to enable the generation of the vendor specific request 320.

The vendor X ICR gateway and equipment 224 then process the vendor specific request 320 and returns a vendor specific response 340 to the ICR gateway 214. The ICR gateway would then take the response 340 and provide the VoiceXML browser VoiceXML code to effect the transfer 350. There are two predominant embodiments. In the first embodiment the VoiceXML code 350 is dynamically generated by the ICR gateway 214 (much like a CGI program might generate dynamic HTML for rendering in a web browser). In the other configuration, the VoiceXML code 350 comprises sending one or more predetermined VoiceXML events and setting one or more VoiceXML variables.

In either event VoiceXML code (either the code 350 or the remaining code in the execution flow after the events are thrown back from the ICR gateway 214) are responsible for effecting the instructions indicated by the vendor X ICR gateway 224. For this example, the response 340 indicated to transfer the caller to the phone number +1 (800) 555-5555 and include dialed digits "987654321". In this example, the ICR gateway 214 threw events in the VoiceXML code 350 back to the then running VoiceXML application indicating that a transfer was requested. If the application is correctly programmed, a transfer will result; shown as the phone call 300B using "transfer-connect", also known as "take back and transfer". In some embodiments the call is tromboned with the phone application platform 210 staying on the line to allow the interactive voice application to resume after the tromboned leg of the phone call ends.

The phone call 300B couples the phone 200A in communication with the application provider platform 220, or more specifically the call center equipment at the application provider platform 220. The vendor X ICR gateway and equipment 224 is responsible for interacting with the application provider's equipment to route the phone call 300B to an agent, e.g. at the agent station 230, and provide any necessary screen pops 360 to the agent's computer 232. The screen pops allow an agent's screen to be pre-loaded with information about the customer, e.g. from database lookups, user dialed digits, the caller's telephone identifying information, and more.

Vendor Neutral Request Format Details

The format of the vendor neutral request 310 and the VoiceXML code to effect the transfer 350 will now be considered in greater detail. The basic request format is a URI transmitted using the HTTP protocol between the VoiceXML browser 212 that is executing the current application and the ICR gateway 214. The following shows one possible format for the vendor neutral request:

http://<icr gateway>/<icr path>/?ICRName=<icr system name>&ANI=<telephone identifying information>&DID=<user/app supplied data>

Where <icr gateway> is a valid method of specifying the ICR gateway 214 according to the URI syntax rules, <icr path> is the appropriate path portion for the URI, where <icr system name> is a defined name for specifying an ICR as known to the ICR gateway 214, where ANI is a portion of the telephone identifying information associated with the telephone 200A and where DID is user and/or application supplied data, e.g. dialed digits.

A specific example of placing a vendor neutral request from VoiceXML code may be helpful as shown by this short listing:

```
<subdialog
    src="http://icrgateway.tellme.com/servlet/com.tellme.irc.Transfer
    Info?ICRName=MegaBank&ANI={session.telephone.ani}&
    amp;DID=987654321">
    <catch event="icr.error">
        <audio>There was an ICR error.</audio>
    </catch>
    . . .
    <catch event="icr.normal">
        <audio>The ICR says I should transfer you to
        {session.icr.Label}</audio>
    </catch>
    . . .
</subdialog>
```

The ellipses (". . . ") indicate omitted code that might test for other events indicating result codes such as busy states, a default routing action, and more. The specific event names can be modified for a particular implementation as can the variable name(s) containing the ICR responses.

A more typical result on catching a transfer request would look as follows:

```
<catch event="icr.normal">
    <transfer dest={session.icr.Label} />
</catch>
```

As the above example actually accomplishes a call transfer to the requested destination.

Depending on the capabilities of the particular ICR system there may be one or more types of requests, the above example was for "TransferInfo", but other more request types are also possible depending on the capabilities of ICR systems generally, e.g. "WaitTime", which might return the expected wait time for an agent, e.g. throwing the event "icr.waittime" with session.icr.waittime set to the wait time or throwing "icr.unsupported" if the specific vendor's ICR doesn't support that query type.

A waiting time strategy is one example where the phone application platform can interact extremely well with ICR type systems. That is because if the phone application platform 210 has access to applications providing voice portal-style functions, e.g. access to news, information, entertainment, shopping, and other content, a user can accomplish other tasks and be entertained while she waits for an agent to become available.

Depending on how the VoiceXML browsers 212 are implemented this may create some problems. Both the current VoiceXML 1.0 standard and proposals for VoiceXML 2.0 do not easily handle asynchronous events of the type described above One approach is to periodically send additional queries. This however requires that each VoiceXML application running on the VoiceXML browsers 212 be modified to repeatedly request "WaitingTime" until it reaches a predetermined amount, e.g. 15–20 seconds and then send a "TransferInfo" request.

A more logical approach would be to be able to specify a handler in the VoiceXML browsers 212 to periodically poll the "WaitingTime" and automatically effect the transfer when ready. With this approach it may be more logical to use a tromboned-type transfer so that if the user becomes engaged in a useful activity (e.g. voice commerce) while holding for a live agent she can resume the other activity at the end of the transfer.

E. Conclusion

In some embodiments, processes and apparatus of FIGS. 1A–1B can be implemented using hardware based approaches, software based approaches, and/or a combination of the two. In some embodiments, the ICR gateway 214 uses one or more computer programs that are included in one or more computer usable media such as CD-ROMs, floppy disks, or other media.

Some embodiments of the invention are included in an electromagnetic wave form. The electromagnetic waveform comprises information such as the ICR gateway 214. The electromagnetic waveform may include the programs accessed over a network.

The foregoing description of various embodiments of the invention has been presented for purposes of illustration and description. It is not intended to limit the invention to the precise forms disclosed. Many modifications and equivalent arrangements will be apparent.

What is claimed is:

1. A method of supporting intelligent call routing (ICR) systems of at least a first vendor in a vendor neutral fashion using a computer system, the method comprising:

receiving a request for a call routing function in a vendor neutral format from a program, the request identifying at least a first ICR system to receive the request;

preparing the request in a vendor specific format for transmission to the at least a first ICR system, the vendor specific format selected according to the format used by the at least a first ICR system;

transmitting the request in the vendor specific format to the at least a first ICR system over a network;

responsive to receiving a response over the network from the at least a first ICR system, converting the response into a vendor neutral format; and relaying the response in the vendor neutral format to the program.

2. The method of claim 1, wherein the program is a Voice Extensible Markup Language (VoiceXML) program, the vendor neutral format comprises a hypertext transfer protocol (HTTP) request and wherein the first ICR system is identified by the HTTP request.

3. The method of claim 1, wherein the vendor specific format is not an HTTP request.

4. The method of claim 1, wherein the network comprises a dedicated connection to the at least a first ICR system and the transmitting further comprises establishing a communication channel across the dedicated connection.

5. The method of claim 1, wherein the network comprises a virtual connection to the at least a first ICR system and the transmitting further comprises establishing a communication channel across the virtual connection.

6. The method of claim 1, further comprising maintaining data specifying the vendor specific format and the network for handling requests to the first ICR system and providing one or more programs for communicating in the vendor specific format of the network.

7. The method of claim 1, wherein the program is a VoiceXML program and wherein the relaying comprises generating one or more predetermined events and setting one or more variables in the execution context of the VoiceXML program according to the response.

8. The method of claim 7, the one or more predetermined events comprises a transfer event and wherein the one or more variables includes a transfer number variable.

9. An apparatus for supporting intelligent call routing (ICR) systems of at least a first vendor in a vendor neutral fashion using a computer system, the apparatus comprising:

means for receiving a request for a call routing function in a vendor neutral format from a program, the request identifying at least a first ICR system to receive the request;

means for preparing the request in a vendor specific format for transmission to the at least a first ICR system, the vendor specific format selected according to the format used by the at least a first ICR system;

means for transmitting the request in the vendor specific format to the at least a first ICR system over a network;

means for converting the response into a vendor neutral format responsive to receiving a response over the network from the at least a first ICR system; and means for relaying the response in the vendor neutral format to the program.

10. An electromagnetic waveform comprising a computer program for supporting intelligent call routing (ICR) systems of at least a first vendor in a vendor neutral fashion using a computer system, the computer program comprising:

a first set of instructions for receiving a request for a call routing function in a vendor neutral format from a program, the request identifying at least a first ICR system to receive the request;

a second set of instructions for preparing the request in a vendor specific format for transmission to the at least a first ICR system, the vendor specific format selected according to the format used by the at least a first ICR system;

a third set of instructions for transmitting the request in the vendor specific format to the at least a first ICR system over a network;

a fourth set of instructions for converting the response into a vendor neutral format responsive to receiving a response over the network from the at least a first ICR system; and a fifth set of instructions for relaying the response in the vendor neutral format to the program.

11. The method of claim 10, wherein the third set of instructions further comprises a set of instructions for interfacing with a vendor provided programming library.

12. The method of claim 10, wherein the third set of instructions further comprises a set of instructions for interfacing with a vendor provided application.

* * * * *